(12) United States Patent
Shkel et al.

(10) Patent No.: US 7,726,199 B2
(45) Date of Patent: Jun. 1, 2010

(54) DIELECTROSTRICTIVE SENSOR FOR MEASURING DEFORMATION

(75) Inventors: Yuri Michael Shkel, Fitchburg, WI (US); Ho Young Lee, Madison, WI (US); Yiyan Peng, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 12/108,380

(22) Filed: Apr. 23, 2008

(65) Prior Publication Data
US 2009/0249885 A1 Oct. 8, 2009

Related U.S. Application Data

(60) Provisional application No. 61/123,414, filed on Apr. 8, 2008.

(51) Int. Cl.
*G01L 1/00* (2006.01)
*G01L 1/14* (2006.01)
(52) U.S. Cl. ........................................ 73/780
(58) Field of Classification Search ............... 73/780
See application file for complete search history.

(56) References Cited

U.S. PATENT DOCUMENTS

| | | | |
|---|---|---|---|
| 4,649,759 A | 3/1987 | Lee | |
| 4,939,930 A | 7/1990 | Ishizuki et al. | |
| 5,747,698 A | 5/1998 | Spillman et al. | |
| 5,880,924 A | 3/1999 | Kumar et al. | |
| 6,441,449 B1 | 8/2002 | Xu et al. | |
| 6,486,656 B1* | 11/2002 | Schroeder | 324/207.21 |
| 6,588,672 B1 | 7/2003 | Usami | |
| 6,910,385 B2 | 6/2005 | Shkel | |
| 2005/0156881 A1* | 7/2005 | Trent et al. | 345/157 |

OTHER PUBLICATIONS

Ho Young Lee; Shkel, Y.M., "Sensing strains and stresses through dielectrostriction response," Sensors, 2005 IEEE, pp. 1002-1005, Oct. 30-Nov. 3, 2005.*
Filanc-Bowen, T.R.; Geun Hyung Kim; Shkel, Y.M., "Novel sensor technology for shear and normal strain detection with generalized electrostriction," Sensors, 2002. Proceedings of IEEE, vol. 2, pp. 1648-1653, 2002.*
Ho Young Lee; Peng Y.; Shkel Y.M., "Strain-dielectric response of dielectrics as foundation for electrostriction stresses," Journal of Applied Physics, 2005, vol. 98.*

(Continued)

*Primary Examiner*—Lisa M Caputo
*Assistant Examiner*—Punam Patel
(74) *Attorney, Agent, or Firm*—Boyle Fredrickson, S.C.

(57) ABSTRACT

An apparatus and method directed to a solid-state capacitance sensor for measuring a strain force on a dielectric including at least one pair of electrostriction sensors each sensor having at least two electrodes and each having a central axis. The central axes are disposed in a common plane and are oriented substantially mutually perpendicularly to one another. Preferably, at least two pairs of sensors, forming a rosette, are provided to facilitate multi-component analysis of a sample having dielectric properties under stress/strain.

24 Claims, 6 Drawing Sheets

OTHER PUBLICATIONS

Ho Young Lee; Shkel Y.M., "Dielectric response of solids for contactless detection of stresses and strains," Sensors and Actuators A, Apr. 8, 2007. vol. 137, pp. 287-295.*

Sun, Y.; Cross, L.E., "Investigations of Electrostriction Effects in Glass by Uniaxial Stress Compressometer," Applications of Ferroelectrics. 1986 Sixth IEEE International Symposium on, pp. 735-739, 1986.*

GANA TD 05-0108. Glass Informational Bulletin published by The Glass Association of North America. pp. 1-3. Jan. 2008.*

P.L. Fuhr, *Measuring with Light*, Sensors Online, May 2000.

R. Pelrine, R. Kornbluh and G. Kofod, *High Strain Actuator Materials Based on Dielectric Elastomers*, Advanced Materials—2000, www.doi.wiley.com.

* cited by examiner

DIELECTROSTRICTIVE SENSOR FOR MEASURING DEFORMATION

CROSS REFERENCE TO RELATED APPLICATION

This invention claims priority from Provisional Application No. 61/123,414 entitled Dielectrostrictive Sensor for Measuring Deformation filed Apr. 8, 2008, the entirety of which is hereby incorporated by reference.

REFERENCE TO GOVERNMENT GRANT

This invention was made with United States government support awarded by the following agency: NSF 0437890. The United States government has certain rights in this invention.

BACKGROUND OF THE INVENTION

1. Field of the Invention

The present invention is directed to strain sensors, and more particularly, a solid-state sensor that detects deformation based on the dielectrostrictive response of the corresponding sample under test.

2. Description of Related Art

Strain gauges or sensors have been employed in a wide variety of applications. Conventional strain sensors are typically used for measuring the expansion and/or contraction of an object under stress. A common type of strain sensor comprises a resistive transducer. Other types of strain sensors include air-gap capacitive sensors (including capacitors that simulate adjacent parallel capacitors), piezo resistors (including silicon strain gauges and conductive elastomer resistive strain gauges), piezoelectric devices such as lead zirconium-titanate (PZT), as well as others.

Resistive strain sensors generate the resistance change that is proportional to the amount the object being measured is deformed under strain. In one type of resistive of the object it is mounted on in a predetermined direction. Such a sensor requires either a DC or an AC excitation voltage to generate an electric output signal proportional to the strain. In addition, auxiliary equipment (for example, connecting the sensor in a differential arrangement such as in a wheatstone bridge circuit), typically must be provided to accurately determine the amount of strain.

Capacitance strain gauges, such as those shown in FIGS. 1A and 1B, depend on geometric features of the gauge to measure strain. In FIG. 1A, a capacitance strain sensor 10 includes opposed parallel plates 12, 14 separated by a pair of spacers 16, 18, which collectively define an air gap 20. Or, as shown in FIG. 1B, a capacitance strain sensor may include a single spacer 16 to separate the opposed plates 12, 14, which may be preferred depending on the type of forces being sensed or required mounting configuration. As a compressive load is applied to the sensor, as shown, the separation between the opposed plates changes (e.g., narrows as shown in FIGS. 1A and 1B when subjected to a compressive load), thus causing a change in capacitance. In particular, capacitance, C, of a parallel plate capacitor can be characterized as being proportional to A×K/h where A is the plate area, K is the dielectric constant of the dielectric material; between two plates and "h" is the separation between the plates. As a result, the capacitance can be varied by changing the plate area, A, or the gap, h. The electrical properties of the materials used to form the sensor are generally unimportant, so the capacitance strain gauge materials can be chosen to meet the mechanical requirements of the particular application. Therefore, such sensors are useful in those instances where a more rugged sensor is needed, providing a significant advantage over resistance strain gauges. However, as discussed below, such sensors have drawbacks of their own.

Although useful for certain applications, the above-described sensors have inherent drawbacks. Resistive strain sensors require relatively complex measurement equipment (e.g., a wheatstone bridge), and can have less than ideal robustness. Moreover, resistive strain gauges dissipate a significant amount of heat, thus making their implementation impractical for many applications contemplated by the present invention including, for example, when the sensor is embedded with the object being sensed. Conventional capacitance strain gauges, although more robust than resistance strain gauges, are limited by the range of forces they can sense. For instance, measuring shear forces with a conventional capacitance sensor is difficult. Also, conventional air-gap capacitance strain sensors are not sufficiently sensitive for the applications contemplated by the present invention and, in any event, are vulnerable to overload in the presence of large forces, thus further limiting their application.

Moreover, in a common capacitance strain sensor, capacitance is given by $$C = \epsilon_0 \epsilon A / h \qquad \text{Equation 1}$$

where $\epsilon_0$ is the dielectric constant of free space, $\epsilon$ is the dielectric constant of the material between the electrodes, A is the electrode area, and h is thickness of the layer. Deformation changes the gap, h, the area, A, and affects the dielectric constant, $\epsilon$. The relative variation in the capacitance can be expressed as $$\frac{\Delta C}{C} = -\frac{\Delta h}{h} + \frac{\Delta A}{A} + \frac{\Delta \varepsilon}{\varepsilon}. \qquad \text{Equation 2}$$

The first two terms in Equation 2 represent the contribution of electrode geometry which is well-addressed in the prior art. The last term represents the contribution due to the dielectrostriction effect which is largely overlooked in the sensor art. However, available theoretical and experimental results predict the dielectrostriction effect typically dominates the geometric variations.

Unfortunately, constraints at the interface between the electrodes and the dielectric layer strongly influence the strain-dielectric response, $\Delta\epsilon/\epsilon$, for a parallel-plate configuration. This can be illustrated by considering variations of dielectric properties with deformations. For example, according to Equation 1 uniaxial compression changes both the thickness, $\Delta h/h \approx u_{33}$, and the volume, $\Delta V/V \approx u_{ii} = u_{11} + u_{22} + u_{33}$, of the layer. If the dielectric layer is allowed to freely slip between the electrodes, the resulting lateral expansions of the material try to preserve its volume, $u_{11} = u_{22} = -vu_{33}$, and thus $\Delta V/V = (1-2v)u_{33}$. If the dielectric layer is constrained so no lateral expansions are allowed, it can be compressed only in the z-direction, and thus $u_{33}(=\Delta h/h)$ and $u_{11} = u_{22} = 0$, which results in $\Delta h/h = \Delta V/V = u_{33}$. Therefore, the measured variations of the dielectric constant range from $\Delta\epsilon_{33} = [\alpha_1 + (1-2v)\alpha_2]u_{33}$ to $\Delta\epsilon_{33} = (\alpha_1 + \alpha_2)u_{33}$ for various boundary constraints. A vital drawback is that the correct type of the constraints for a given thin-dielectric-layer setup is typically unknown.

In any event, with each of the above-noted sensors, the sensors are external or separate from the object experiencing stress/strain. It follows that direct sensing of stresses or strains through physical response of a material composing the structure itself would be more attractive. Elimination of embedding, attaching, and interfacing external devices reduces cost, power consumption and increases reliability of the system.

One approach to achieving such direct sensing is to embed or laminate a material having an intrinsically self-sensing capability into the load-bearing structure. For example, piezoresistive response of graphite fibers in a polymeric matrix is linked to deformation of the composite. Similarly, a surface-bonded or embedded piezoelectric material or glass-optical fibers can be also utilized for monitoring the deformations. However, introducing self-sensing materials into the load-bearing structure has many shortcomings.

For instance, embedded material increases cost, affects mechanical response and reliability of the structure. Also, stiffness mismatch of the matrix and the embedded elements may result in poor strain transfer and be an additional source of system degradation. In addition, wiring or interfacing embedded sensors increases risks of operational failure of the system, and only few materials possess the piezoelectric, piezoresistive or optical responses required for implementation of the traditional approaches discussed above.

In response to these challenges, the sensor disclosed in U.S. Pat. No. 6,910,385 ("the '385 patent") to the present assignee was developed. The '385 patent, which is hereby expressly incorporated by reference herein, discloses a solid-state capacitance strain sensor that operates based on variation of dielectric properties with deformation, also known as electrostriction or dielectrostriction. The sensor may be configured as a two-sided device according to the design of a conventional capacitor, or alternatively may be configured as a one-sided device as a line capacitor sensor. Moreover, the dielectric material employed in the sensor may be micro-tailored according to particular applications to increase sensitivity to, for example, shear or normal deformation.

In one preferred embodiment of the '385 patent, the dielectric is the object being sensed while appropriately placed electrodes that interface directly with the object under test measure capacitance changes in response to deformation of the object in response to incident forces. Such capacitance changes are caused by a change in the dielectric constant of the object being sensed as deformation due to forces, for example, shear and/or compressive, are exerted thereon. More particularly, the solid-state capacitance includes at least one pair of electrodes disposed so as to interface with the dielectric. Electrodes can be attached to the dielectric and move following the deformation. The sensor system includes a measuring circuit coupled to the electrodes to measure a change in the dielectric constant in response to the deformation. In operation, the change in the dielectric constant is caused by an electrostrictive response of the dielectric to the strain. The response is quantified by computing a change in the dielectric constant based on a measured change in capacitance.

Though useful, the disclosed embodiments of the '385 patent do not provide an elegant solution to providing a cost-effective sensor for multi-component (three-axis) strain/stress detection. Moreover, with mechanical contact to the monitored part, movement of the electrodes can corrupt the acquired data, while the stand-alone nature of the sensor is susceptible to electrical noise, thermal effects and related signal corruption. Overall, a robust solution was needed for a range of applications including in-line monitoring of various load-bearing structures, stand-alone sensing devices and arrays for stress/strain mapping (for example, tactile sensing), process monitoring of toughened (tempered) glasses, residual stresses in plastic parts, to name a few.

SUMMARY OF THE INVENTION

The preferred embodiment is directed to a solid-state capacitance strain sensor that operates based on variation of dielectric properties with deformation, and particularly planar capacitor sensor rosettes capable of simultaneously detecting all dielectric constants of an anisotropic material without mechanical contact to the monitored part. The dielectric response of any dielectric material varies with deformations. This effect, called dielectrostriction, can be utilized for monitoring stresses and strains in elastic and viscoelastic liquid and solid dielectric materials. In the preferred embodiments, a planar capacitor sensor and sensor rosettes can detect deformations without mechanical contact with the monitored part. Outputs of two-sensor and four-sensor rosettes attached to isotropic material are directly proportional to the principal directions and the difference of in-plane principal strains or stresses. Notably, proportionality between the stress- and strain-dielectric responses is provided. The principal strains and their principal directions and out-of-plane shear strains are measured using a range of multi-sensor rosettes. The developed sensing technology provides a novel approach for stand-alone sensors and a suitable solution for implementation of self-sensing stresses and strains in load-bearing structures.

According to a first aspect of a preferred embodiment, a solid-state capacitance sensor for measuring deformation of a sample having dielectric properties including at least one pair of electrostriction sensors each sensor having at least two electrodes and each having a central axis, the central axes being disposed in a common plane and oriented substantially mutually perpendicularly to one another.

In another aspect of this preferred embodiment, the sensors further includes a measuring circuit that measures capacitance of each sensor in response to the deformation. A difference in the measured capacitance is indicative of an amount and a direction of the deformation. In this case, the measuring circuit may be a capacitor bridge circuit.

According to a further aspect of this preferred embodiment, at least one pair of the sensors defines a first rosette that measures a component of the deformation having a first principal axis.

According to an additional aspect of this preferred embodiment, the first rosette includes first and second pairs of sensors, in which the first and second sensor pairs are disposed in the common plane and are shifted about 45 degrees with respect to one another.

In another aspect of this preferred embodiment, the sensor also includes a second rosette that measures a second component of the deformation having a second principal axis. Moreover, the first and second principal axes are substantially orthogonal to one another.

In a still further aspect of this preferred embodiment, at least one pair of sensors includes a minimum of four pairs of sensors that are shifted about 22.5 degrees with respect to one another and define a rosette which measures multiple components of the deformation. In addition, those sensors also include interdigitated electrodes and are pie-piece shaped.

According to another aspect of this embodiment, the electrodes include at least three interdigitated electrodes and are supported by a substrate.

In yet another aspect of this embodiment, the sensors are microfabricated using a CMOS technique.

In a further aspect of this preferred embodiment, the sensor further includes a thin layer of material [mineral oil] disposed between the sensors and the sample to facilitate dielectric coupling between the sensors and the sample.

According to a still further aspect of this embodiment, the sample used is tempered glass and the sensors measure at least one of a group including stress and strain during formation of the glass.

According to a still further aspect of this embodiment, the sample used is liquid polymer or liquid suspensions and the sensors measure at least one of a group including stress and strain during the flow.

In another aspect of this embodiment, the sensors do not dissipate heat.

According to another preferred embodiment, a method of sensing a deformation of a sample having dielectric properties includes providing at least one pair of dielectrostriction sensors with each sensor of the pair having at least two electrodes and each having a central axis. The central axes are disposed in a common plane and are oriented substantially mutually perpendicularly to one another. In addition, the sensors are positioned adjacent to the dielectric sample having a dielectric property. In operation, the method measures a change in capacitance associated with each sensor.

According to a further aspect of this embodiment, further including computing a difference in the measured capacitance associated with each pair, and determining the deformation by computing a change in a dielectric property of the sample based on the difference. Notably, the electrodes do not substantially move such that the determined deformation is based substantially only on the electrostrictive response of the dielectric to the deformation.

According to a still further aspect of this embodiment, the at least one pair of sensors includes at least four pairs of sensors and are shifted about 45 degrees with respect to one another. The sensor pairs detect multiple components of the deformation.

In another aspect of this embodiment, the sensors include interdigitated electrodes mounted to a substrate.

In yet another preferred embodiment, a method of measuring deformation of a sample having dielectric properties includes providing a capacitive sensor rosette disposed adjacent to the sample, and using the sensor rosette to make an in-situ measurement of the deformation during fabrication of a sample.

According to a further aspect of this preferred embodiment, the sensor rosette measures a change in capacitance in response to the deformation, and wherein the capacitance change is based substantially only on the electrostrictive response of the sample to the deformation. In one application, the sample is tempered glass during its formation.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

The present invention is directed to a sensor responsive to the dielectric response of any liquid or solid dielectric material changes with applied stress or strain. Deformation-induced change of dielectric properties can be monitored using a dielectrostriction sensor which is essentially a capacitor having a low energy consumption and no heat dissipation. Dielectrostriction sensing provides ready manufacturing and implementation not typical for traditional capacitor sensing techniques.

Figure 1A:
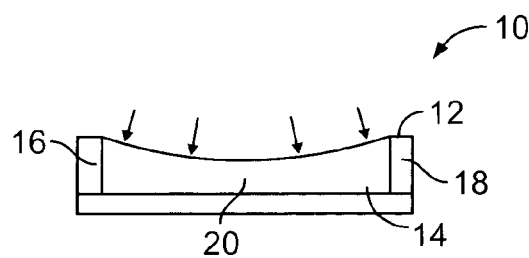
FIGS. 1A and 1B are prior art air gap capacitive sensors.
Figure 1B:
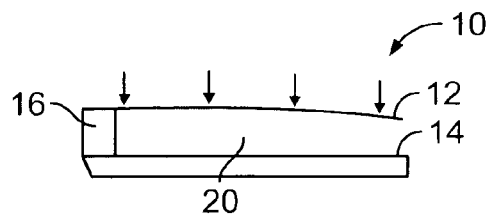
Figure 2:
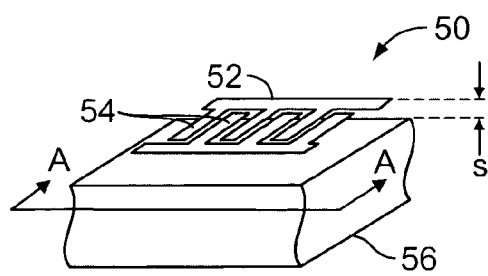
FIG. 2 is a prior art capacitive strain sensor including interdigitated electrodes and shown spaced from the sample under test, according to a preferred embodiment.
Figure 3:
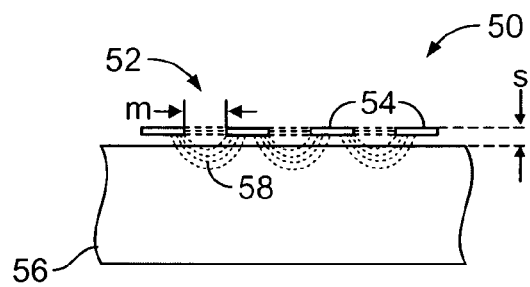
FIG. 3 is a prior art cross-sectional view along A-A' of the sensor/sample of FIG. 2.

The preferred embodiments utilize a planar capacitor design of the dielectrostriction sensor. Turning initially to FIGS. 2 and 3, one such sensor 50 consists of a series of interdigitated electrodes 54, preferably deposited on a rigid substrate (see FIG. 2). The capacitance variation occurs due to changing dielectric properties of the material rather than mechanical displacements of the electrodes such that the sensor does not require mechanical contact with a monitored part 54 having dielectric properties. In addition, the planar geometry of interdigitated sensor 50 is compatible with standard CMOS processing and the signal conditioning circuits can be incorporated right on the same substrate. Moreover, as discussed further below, such sensors can be arranged in rosettes to resolve several deformation parameters (e.g., principal directions and differences in principal strains) at once.

Again, deformation induced changes dielectric properties can be observed in any dielectric material. This effect, called dielectrostriction, is formulated as a linear relation between stresses or strains and dielectric response of a linear elastic material. Phenomenology of this effect can be illustrated by decomposing an arbitrary deformation into volume and linear contributions. For example, a variation of apparent dielectric constant, $\Delta \in$, of a dielectric layer in a parallel-plate capacitor can be expressed through the relative change of the layer's thickness, $\Delta h/h$, and the relative change of its volume, $\Delta V/V$, $$\Delta \varepsilon = \alpha_1 \frac{\Delta h}{h} + \alpha_2 \frac{\Delta V}{V} \quad \text{Equation 3}$$

where $\Delta_1$ and $\Delta_2$ are so-called electrostriction parameters. They also determine the electrostriction stresses in an isotropic dielectric. Arbitrary deformations are described by a second-rank strain tensor, $$u_{ik} = \frac{1}{2}(\partial U_i/\partial x_k + \partial U_k/\partial x_i),$$

where $U=(U_1, U_2, U_3)$ is the displacement field of the material. To generalize formulation of the dielectrostriction, the dielectric constant of undeformed material, $\in$, should be replaced with its matrix presentation, $\in \delta_{ik}$ where $\delta_{ik}$ is the Kronecker delta.

Deformations introduce anisotropy into an initially isotropic material and its dielectric properties are represented by a second-rank dielectric tensor, $\in_{ik}$. Therefore, the changes of dielectric properties are expressed as $\Delta \in_{ik} = \in_{ik} - \in \delta_{ik}$. Similarly, the linear deformation term, $\Delta h/h$, and the volume deformation term, $\Delta V/V$, are consequently replaced with the strain component $u_{ik}$, and the first strain invariant, $u_{ll}(\equiv u_{11}+u_{22}+u_{33})$. The most general linear relationship between deformations and dielectric properties of an isotropic material is $$\in_{ik} = \in \delta_{ik} + \alpha_1 u_{ik} + \alpha_2 u_{ll} \delta_{ik} \quad \text{Equation 4}$$

Parameters $\alpha_1$ and $\alpha_2$ for composites having randomly distributed polarizable inclusions are estimated as $$\alpha_1 = -\frac{2}{5}(\varepsilon - 1)^2 \quad \text{Equation 5}$$

and $$\alpha_2 = -\frac{1}{3}(\varepsilon - 1)(\varepsilon + 2) + \frac{2}{15}(\varepsilon - 1)^2$$

These expressions work surprisingly well even for homogeneous solid materials [13]. A stress-dielectric relation in linear elastic solid dielectrics can be obtained by applying Hooke's law. The stress-dielectric relation in elastic materials introduces two material coefficients, $\pi_1$ and $\pi_2$, $$\in_{ik} = \in \delta_{ik} + \pi_1 \sigma_{ik} + \pi_2 \sigma_{ll} \delta_{ik}, \quad \text{Equation 6}$$

where $\sigma_{ik}$ are components of the stress.

The dielectrostriction effect involves the change of dielectric properties with deformation. A typical configuration for dielectric measurements is a parallel-plate capacitor but, as-discussed at length above, such configuration is not ideal for dielectrostriction sensing due to mechanical constraints of the geometry. For example, assessment of deformations in a thin-layer specimen located between the electrodes remains an experimental challenge which is hard to resolve. Fortunately, in the preferred embodiment dielectrostriction measurements target changing capacitance due to changing dielectric properties of the monitored material rather than the electrode displacements. This allows for utilizing a planar capacitor sensor having electrodes deposited on a rigid substrate. Such a sensor can be attached to the specimen without producing any mechanical constraints and thus overcomes the limitations of the parallel-plate capacitor design.

With particular reference to FIG. 3, sensor 50 including interdigitated fingers or electrodes 54 is powered by a function generator (see FIGS. 9 and 10) when in operation. In response, a field 58 penetrates the dielectric sample, specimen under test, and when deformed, the dielectric properties of sample 56 change causing a change in capacitance between adjacent ones of electrodes 54. Notably, sensor 50 is not directly coupled to sample 56, but is spaced therefrom by a small distance "s". In this case, for a thick sample, the measured dielectric response is concentrated near the surface, but such measurement is more indicative of the strain field than the measurements by conventional strain gages limited by the surface-sensor interface. In addition, the field penetration is sufficient to measure the dielectric response due to in-depth shear deformations. Moreover, spacing "m" can be increased to facilitate greater depth of measurement but if configured as such, sensitivity and resolution may be compromised.

The present design resolves all difficulties with the boundary constraints during dielectrostriction measurements. A sensor 70 shown in FIG. 4 has electrode elements or interdigitated fingers 74 (herein referred to as "electrodes") deposited on a rigid substrate. Electrodes 74 of width, w, are separated by a distance, a. Both the thickness of the dielectric layer, h, and the length of the electrode, l, are much larger than the electrode width and separation (h,l>>a,w). The sensor is located at surface of the monitored part and ideally provides no constraints to deformation.

Figure 4:
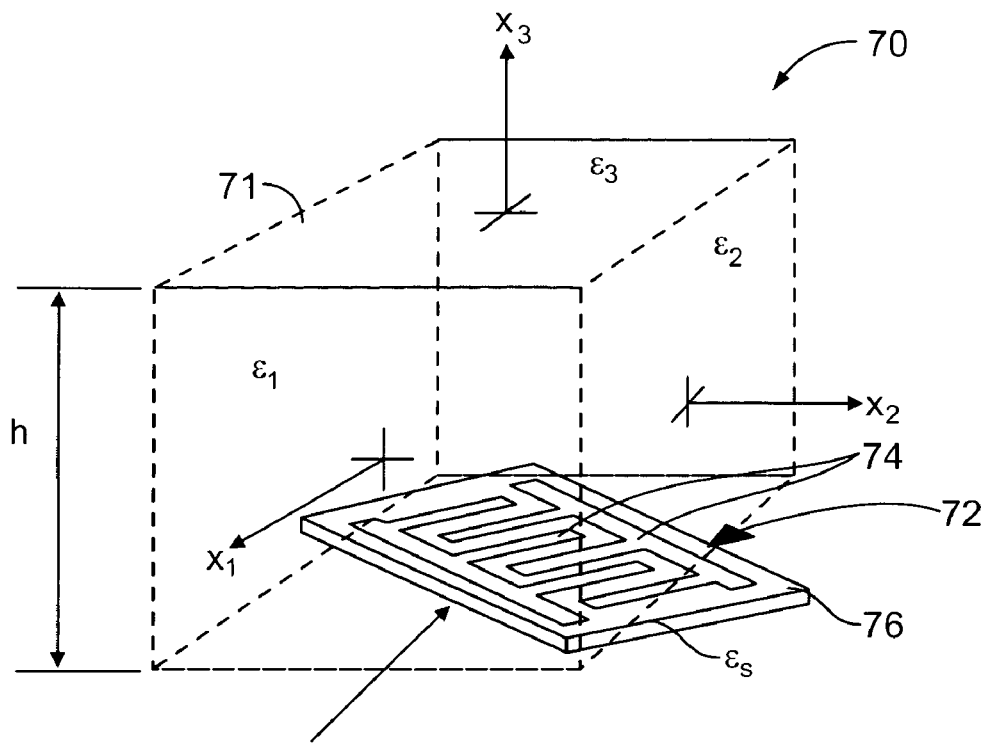
FIG. 4 is a prior art schematic perspective view of a planar capacitive solid-state strain sensor according to the preferred embodiment, the sensor being disposed in a plane defined by two orthogonal principal axes, $x_1$ and $x_2$.
Figure 5:
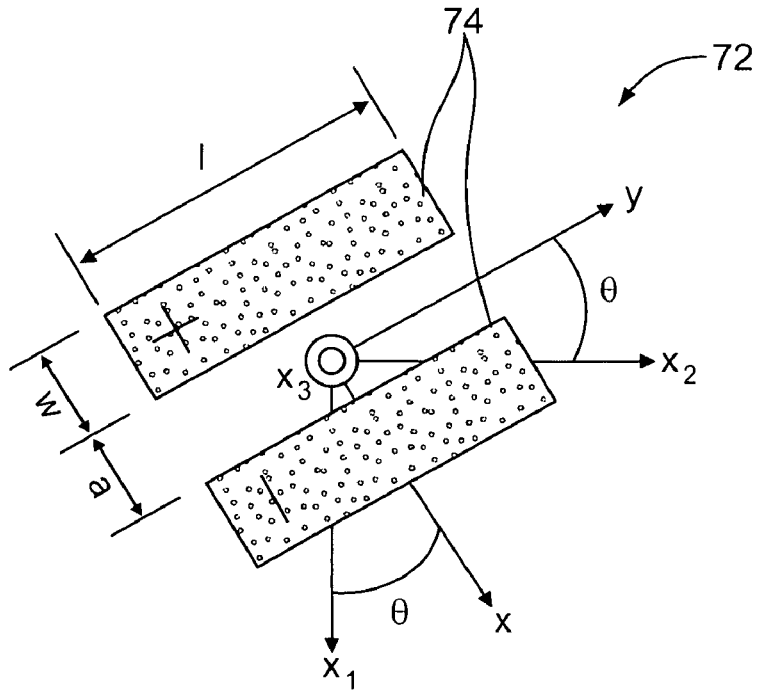
FIG. 5 is a prior art plan view of two of the electrodes of the sensor shown in FIG. 4.

With reference to FIG. 4, considering an anisotropic dielectric material 71 attached to the electrodes, dielectric properties of the material are described by a symmetric 3×3 the matrix having up to six independent components. In FIG. 4, one can always select a special co-ordinate system $x_1 x_2 x_3$ in which the dielectric matrix has only three diagonal components $\in_1, \in_2, \in_3$ is provided. This special coordinate system is called the principal coordinate system and values $\in_1, \in_2, \in_3$ are the principal dielectric constants. Note that dielectric properties of the material are still described by six independent values: three angles defining the principal coordinate system and three principal dielectric constants. The electrodes in FIG. 5 are located in the xy-plane and form an angle, $\theta$, with the axis, $x_1$, where $x_1 x_2 x_3$ is the principal coordinate system. The capacitance, $C_\theta$, of a planar capacitor attached to an anisotropic material is, $$C_\theta = \frac{Q}{V} = C_0(\varepsilon_{\text{eff}}^t + \varepsilon_s), \quad \text{Eqn. 7}$$

$$C_0 = \varepsilon_0 L \frac{1}{\pi} \ln\left(1 + \frac{w}{a}\right)$$

$$\varepsilon_{\text{effective}} = (\varepsilon_{xx}\varepsilon_{zz} - \varepsilon_{xz}^2)\cos^2\theta + (\varepsilon_{yy}\varepsilon_{zz} - \varepsilon_{yz}^2)\sin^2\theta +$$
$$2(\varepsilon_{xy}\varepsilon_{zz} - \varepsilon_{xz}\varepsilon_{yz})\cos\theta\sin\theta$$

where $\in_s$ is dielectric constant of the sensor substrate, $\in_{\text{eff}}^t$ is the effective dielectric constant of the material on the top, L is total length of all electrode strips, and $2C_0$ represents capacitance of the electrodes in free space. Only one dimensionless combination, w/a, of the two geometric parameters, electrode width, w, and electrode separation, a, contributes to a numerical coefficient in the expression for $C_0$. When a=w, this numerical coefficient has been estimated to be $(\ln 2)/\pi$. Alternatively, the value $C_0$ can be directly measured for any given electrode pattern.

According to the strain-dielectric relation in Equation 4, the deformed isotropic material becomes dielectrically anisotropic and dielectric constant becomes a second rank tensor, $$\epsilon = \begin{bmatrix} \varepsilon + \alpha_1 u_{xx} + \alpha_2 u_{ll} & \varepsilon + \alpha_1 u_{xy} & \varepsilon + \alpha_1 u_{xz} \\ \varepsilon + \alpha_1 u_{xy} & \varepsilon + \alpha_1 u_{yy} + \alpha_2 u_{ll} & \varepsilon + \alpha_1 u_{yz} \\ \varepsilon + \alpha_1 u_{xz} & \varepsilon + \alpha_1 u_{yz} & \varepsilon + \alpha_1 u_{zz} + \alpha_2 u_{ll} \end{bmatrix} \quad \text{Equation 8}$$

The principal dielectric directions, $x_1 x_2 x_3$, of the deformed material coincide with the principal directions of strains. Equation (7) yields the following capacitance response of the planar sensor attached to deformed isotropic material, $$C_\theta = C_0 \left\{ \varepsilon + \frac{k_1 \left( \begin{array}{c} s_{xx}\cos^2\theta + \\ s_{yy}\sin^2\theta + \\ 2s_{xy}\sin\theta\cos\theta + s_{zz} \end{array} \right) + 2k_2 s_{ll}}{2} + \frac{k_1^2 \left[ \begin{array}{c} (s_{xx}s_{zz} - s_{xz}^2)\cos^2\theta + \\ (s_{yy}s_{zz} - s_{ys}^2)\sin^2\theta + \\ 2(s_{xy}s_{zz} - s_{xz}s_{yz})\cos\theta\sin\theta \end{array} \right]}{2\varepsilon} + \frac{k_1 k_2 s_{ll} \left( \begin{array}{c} s_{xx}\cos^2\theta + \\ s_{yy}\sin^2\theta + \\ 2s_{xy}\cos\theta\sin\theta + s_{zz} \end{array} \right) + k_z^2 s_{ll}^2}{2\varepsilon} + \varepsilon_s \right\} \quad \text{Equation 9}$$

The sensor outputs involve six strain or stress components, see Equation 9.

In the situation where the sample is subjected to only normal deformations, the capacitance of deformed material, $$C_\theta = \frac{C_0}{2}\left\{ \varepsilon + \frac{1}{2}\left[ \left( \frac{1+\cos 2\theta}{2}u_{xx} + \frac{1-\cos 2\theta}{2}u_{yy} + u_{zz} \right)\alpha_1 + 2(u_{xx} + u_{yy} + u_{zz})\alpha_2 \right] \right\}$$

Similarly, the stress-dielectric relation of Equation 6 provides the capacitance output in terms of the principal stresses, $\sigma_1$, $\sigma_2$, and $\sigma_3$, and the stress-dielectric coefficients, $\pi_1$ and $\pi_2$.

$$C_\theta = C_0 \left[ \varepsilon + \varepsilon_s + \frac{1}{2}\left( \frac{1+\cos 2\theta}{2}\sigma_1 + \frac{1-\cos 2\theta}{2}\sigma_2 \right) + \pi_1 + (\sigma_1 + \sigma_2 + \sigma_3)\pi_2 \right] \quad \text{Equation 10}$$

The sensor outputs involve three strain components, see Equation 9, or three stress components, see Equation 10. Notably, volume deformation components, $u_1$, $u_2$, $u_3$ yield little useful deformation information, whereas the anisotropic effects due to deformation characterized by $\sigma_1$, $\sigma_2$, $\sigma_3$ indicate the stresses of interest.

Figure 6:
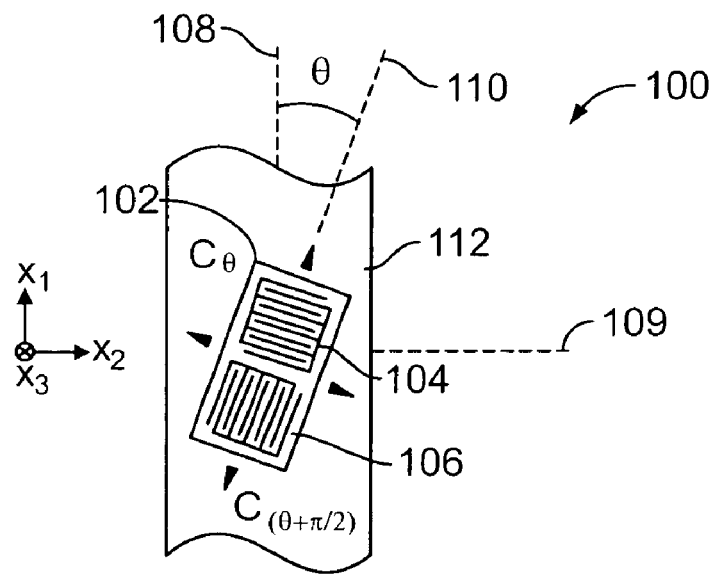
FIG. 6 is a prior art plan view of a two sensor rosette according to a preferred embodiment.

It is beneficial to make two identical sensors operate together. Examples of such sensor rosettes are presented in FIGS. 6 and 7. A sensor rosette 100 in FIG. 6 employs two identical planar sensors 104, 106 which are mutually perpendicular to each other. The capacitances of these sensors are subtracted using a bridge circuit and the resulting output signal has a much simpler form $$C_\theta - C_{\theta+\pi/2} = \frac{C_0}{2}\alpha_1(u_1 - u_2)\cos 2\theta \quad \text{Equation 11}$$

The output of such a rosette is directly proportional to the difference in principal strains, $u_1-u_2$, and the double angle, $2\theta$, between an in-plane principal axis 108 and a central axis 110 of the sensor electrodes 104, 106. Note that there are two in-plane principal axes 108, 109 forming $\pi/2$ angle with each other. However, the double angle dependency of the sensor output is such that it makes no difference which principal direction is selected to describe the sensor alignment. Similarly, the capacitance of two-sensor rosette 102 in terms of the principal stresses is expressed as, $$C_\theta - C_{\theta+\pi/2} = \frac{C_0}{2}\pi_1(\sigma_1 - \sigma_2)\cos 2\theta \quad \text{Equation 12}$$

Figure 7:
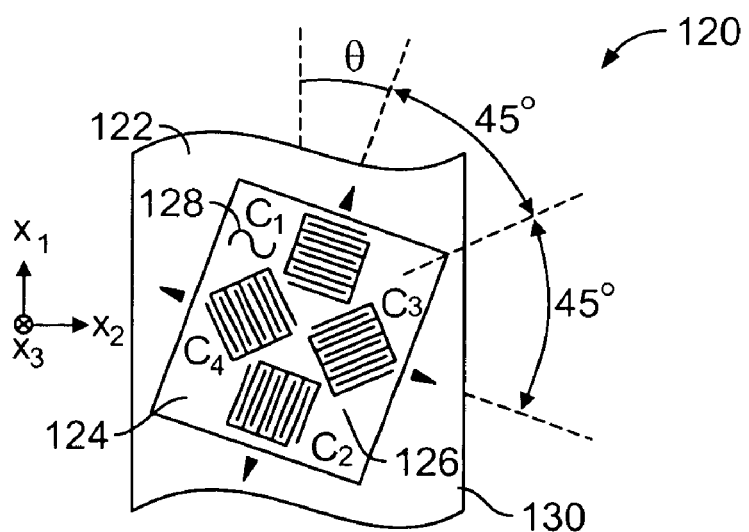
FIG. 7 is a plan view of a four sensor rosette according to a preferred embodiment.

A sensor 120 inducing four-sensor rosette 122 in FIG. 7 is formed by two two-sensor rosettes 124, 126 shifted at $\pi/4$ angle. One rosette 124 is composed of the sensors having capacitances $C_1$ and $C_2$ (aligned at $\theta$ and $\theta+\pi/2$ angles), and the other rosette 126 is composed of the sensors having capacitances $C_3$ and $C_4$ (aligned at $\theta+\pi/4$ and $\theta+3\pi/4$ angles). All four sensors are identical and have the same capacitance in undeformed state. From Equation 11, the differences in capacitances of these two-sensor elements are, $$C_1 - C_2 = \frac{C_0}{2}\alpha_1(u_1 - u_2)\cos 2\theta \quad \text{Equation 13}$$

$$C_3 - C_4 = \frac{C_0}{2}\alpha_1(u_1 - u_2)\sin 2\theta$$

With two simultaneous measurements, four-sensor rosette 122 provides the difference and the principal directions of in-plane strains.

Figure 8:
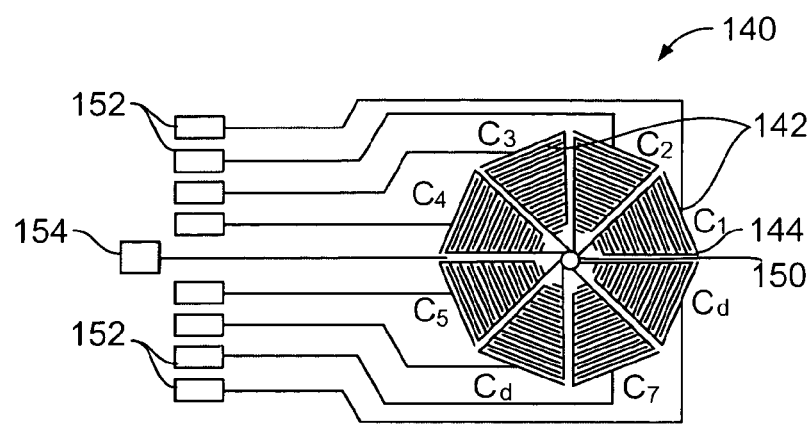
FIG. 8 is a plan view of an eight sensor rosette having pie-shaped sensors having interdigitated electrodes, according to a preferred embodiment.

Turning to FIG. 8, a sensor 140 having an alternate configuration is illustrated. Sensor 140 includes four pairs of sensors, pair 142, including capacitive sensors $C_1$ and $C_3$, being identified as exemplary. Each sensor 144 of the four pairs is pie-piece shaped and powered by a source 154 at point 150 coupled to every other one of the electrode "fingers". Capacitance can be measured at measurement points 152 of the microfabricated device 140. In this case, each pair 142 is shifted relative to an adjacent pair at $\pi/4$ angle. All sensors are identical, but one pair is a "dummy" rosette typically used as a reference for measurement of resting state (no applied stress/strain) deformation. More particularly, dummy rosette $C_d$-$C_d$ allows the sensor to subtract the volume effect (see Equation 9 and corresponding description above) that provides little useful information. Sensor 140 is preferred as it offers the ability to resolve several components of the strain/stress acting on the specimen under test.

The dielectrostriction effect can be formulated using either strains or stresses as the state variables. One preferable implementation of the dielectrostriction sensor is a planar capacitor introduced in previous sections. No mechanical contact is required between the sensor and the part, the sensor does not constrain the material and does not influence the stress/strain distribution in the monitored part. However, as suggested above the sensor should be in close proximity to the part to minimize losses due to the fringe field. Sensors 100, 120, 140 may be interfaced to the part through a thin layer of mineral oil which reduces the mechanical constraints by lubricating the surface. In addition, the oil eliminates moisture effects and lessens the losses of sensitivity due to fringe field. Consequently, all constant additions due to fringe field and the common mode factors such as electrical noise and variation of ambient temperature contribute equally to each sensor in the rosette and cancel each other in the output signal.

Figure 9:
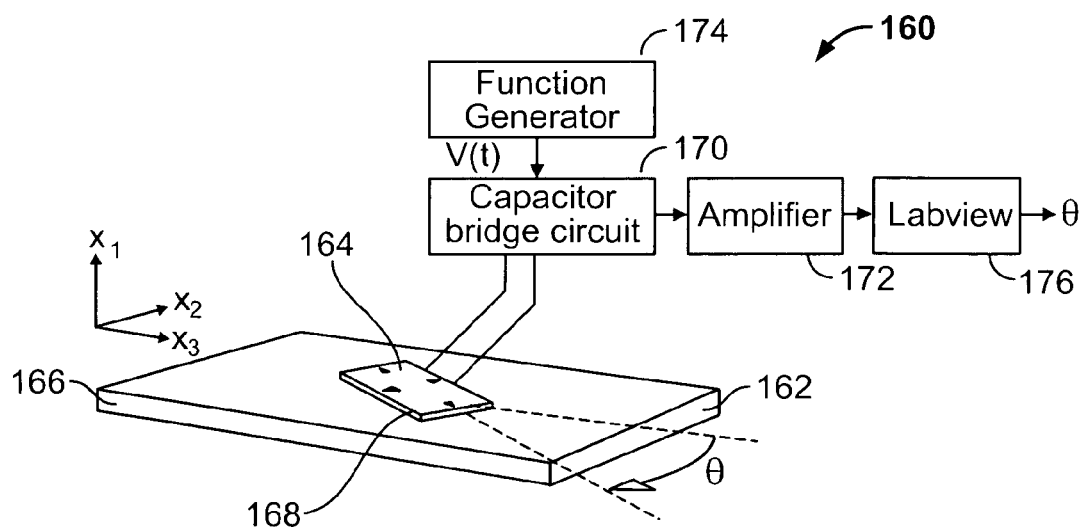
FIG. 9 is a schematic view of an experimental set-up of a sensor rosette measuring fiber alignment of a composite material, according to a preferred embodiment.
Figure 10:
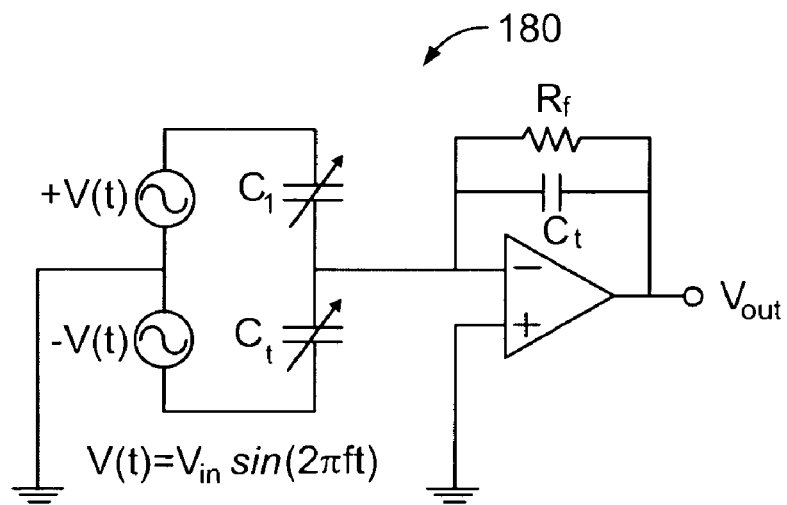
FIG. 10 is a schematic of a capacitor bridge circuit such as that shown in FIG. 9.

Detection and measurement of the dielectrostriction response of a solid material to deformations is illustrated in FIGS. 9 and 10. Notably, the principal strains and their principal directions of a plane-loaded specimen 162 can be measured using a four-sensor rosette 164, for example.

FIG. 9 shows a schematic 160 of a preferred experimental setup. A single sensor or a sensor rosette 168 is located at the surface of a specimen, in this application a composite 162 having aligned fibers 166 is under test. A thin layer of mineral oil 168 between the sensor and the specimen may be employed to minimize mechanical friction, improve dielectric coupling between the sensor and the specimen, and eliminate effects of moisture and contamination on the surface. A load may be applied and the resulting deformations of specimen 162 are recorded. The changes in dielectric properties of specimen 162 may be measured, for example, by two equivalent planar sensors (as shown in FIG. 9) of rosette 168 forming a capacitor bridge circuit 170 and are conditioned by an amplifier 172 (e.g., a lock-in amplifier). A function generator 174 may provide an input voltage, V(t), of amplitude, $V_{in}$=5 V, at an excitation frequency, f=50 kHz. Dielectrostriction sensors have low power consumption and dissipate no energy, as discussed, so output of function generator 174 is sufficient to directly excite bridge 170 without amplification. In one preferred embodiment, the electrode pattern of planar sensor rosette 168 is manufactured from a commercial copper clad with a dry film resist pre-laminated to the surfaces using a photolithography process. In one example, dimensions of a single sensor are 10 mm×10 mm, and the distance between the electrodes is 300 μm and the thickness of the copper layer is less than 10 μm.

In the case of an uni-axial stress load ($\sigma_1 \neq 0$ and $\sigma_2 = \sigma_3 = 0$), the load produces an axial elongation strain-field, $u_1$, and lateral contractions, $u_2 = u_3 = -v u_1$, where v is the Poisson's ratio of the specimen. A two-sensor rosette is attached to the specimen and aligned at θ=0° relative to the loading direction. In this setup, one principal axis, $x_1$, coincides with the loading direction. The sensor electrodes are located in the $x_1 x_2$-plane where $x_2$-axis is another principal axis transverse to the loading direction. The third principal axis, $x_3$, is normal to the sensor plane. The sensor, $C_0°$, is denoted as $C_\perp$ and the other sensor, $C_{90}°$, is denoted as $C_P$, see FIG. 4(a). The difference in capacitance, $\Delta C (= C_\perp - C_P)$, due to uni-axial load can be calculated as, $$\Delta C (= C_\perp - C_P) = \frac{C_0}{2}\alpha_1(1+v)u_1 \qquad \text{Equation 14}$$

The output voltage, $V_{out}$, of the capacitor bridge 120 in FIG. 9 is proportional to the difference in capacitance, ΔC. Coefficient proportionality, K, is defined as $K=2\pi f \cdot V_{in} \cdot R_f$ where f is the frequency and $V_{in}$ is the amplitude of an excitation voltage, and $R_f$ is the gain of a rear amplifier in the bridge, $$V_{out} = 2\pi f \cdot V_{in} \cdot R_f \cdot \Delta C \qquad \text{Equation 15}$$
$$= K \cdot \Delta C$$
$$= K \frac{C_0}{2}(1+v)\alpha_1 u_1$$

For single sensor measurements, sensor, $C_P$, is substituted by a capacitor, $C_d$, to complete the capacitor bridge. The capacitor, $C_d$, is actually the dummy sensor which is attached to the undeformed specimen and its capacitance can be expressed for zero strains as $C_d = C_0(\in + \in_s)$. The capacitance difference, $\Delta C (= C_\perp - C_d)$, and the output voltage, $V_{out}$, are, $$\Delta C(= C_\perp - C_d) = \frac{C_0}{2}[(1-v)\alpha_1 + 2(1-2v)\alpha_2]u_1, \qquad \text{Equation 16}$$
$$V_{out} = K \cdot \Delta C = K\frac{C_0}{2}[(1-v)\alpha_1 + 2(1-2v)\alpha_2]u_1$$

Dielectrostriction measurements with a four-sensor rosette provide the principal directions and the difference of the principal strains. The rosette was attached to a specimen and aligned at an angle, θ, with the loading direction. The outputs of each set of sensors in the four-sensor rosette, $V_{out1}$ and $V_{out2}$, provide the principal-strain difference, $u_1 - u_2$, and the principal direction, θ, $$u_1 - u_2 = \frac{2}{\alpha_1 C_0 K}\sqrt{V_{out1}^2 + V_{out2}^2} \qquad \text{Equation 17}$$

and $$\theta = \frac{1}{2}\tan^{-1}\left(\frac{V_{out2}}{V_{out1}}\right)$$

Referring again to FIG. 9, lock-in amplifier 172 operates to insure only those bridge outputs at the reference frequency of the generated are passed as voltages for further processing. Lab software (e.g., Labview) analyzes the detected change in capacitance to determine deformation. One embodiment of bridge circuit 170 is shown in FIG. 10 circuit 180. Bridge 180 operates to output a voltage (amplitude/direction) corresponding to the detected deformation.

Figure 11:
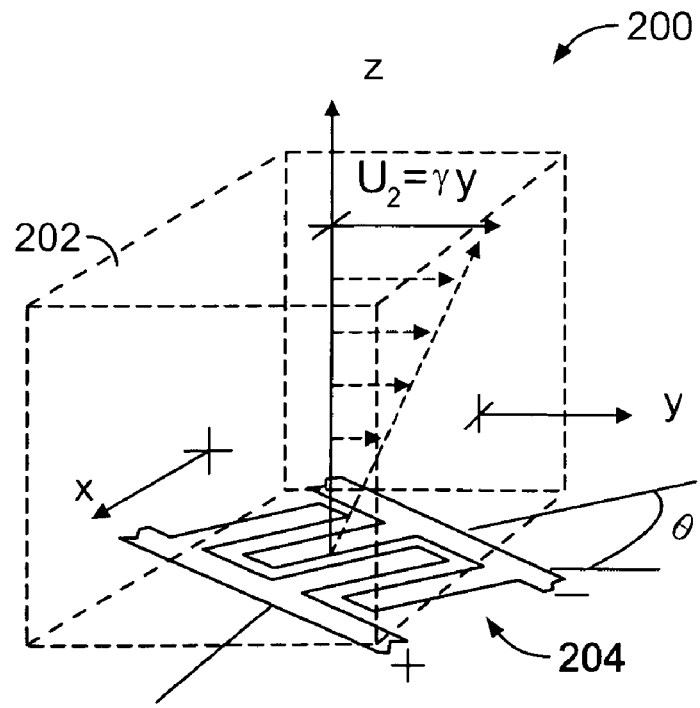
FIG. 11 is a prior art schematic perspective view of a planar capacitive strain sensor, similar to that shown in FIG. 4, illustrating sensing of shear force.
Figure 12:
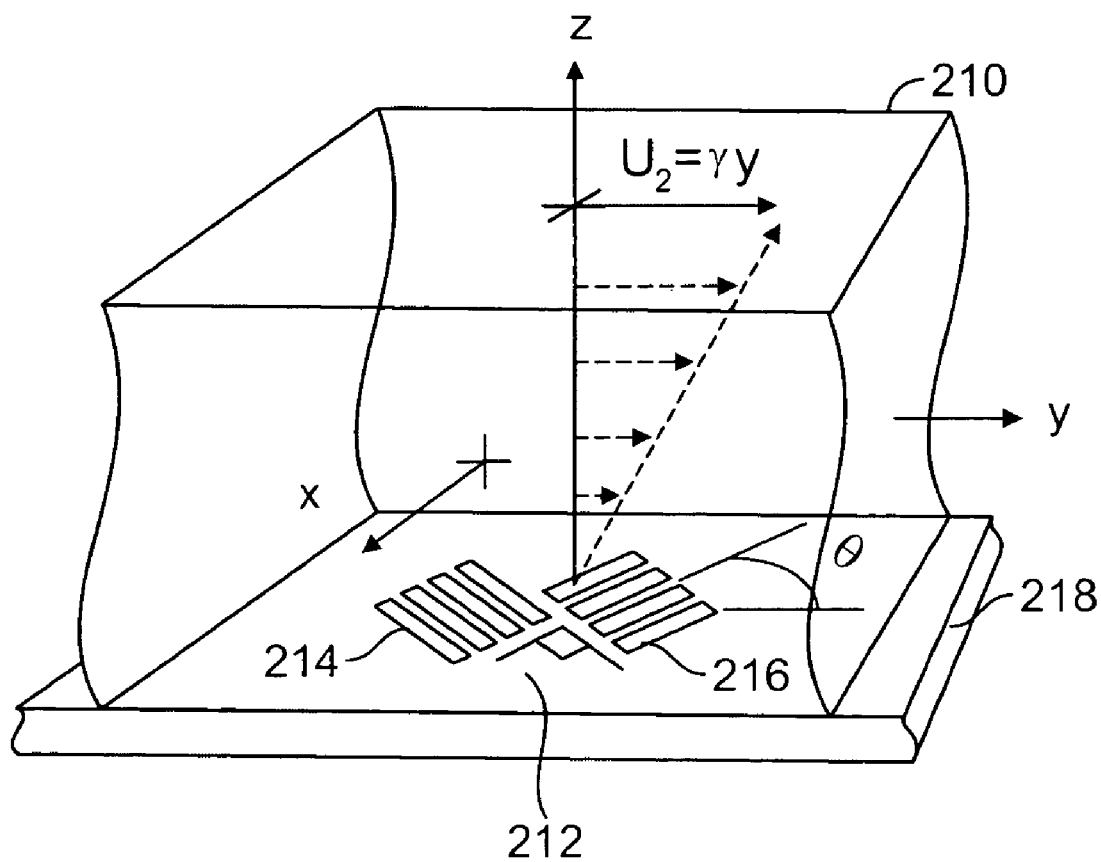
FIG. 12 is a prior art schematic perspective view similar to FIG. 11, illustrating a sensor rosette for shear sensing.

Turning to FIGS. 11 and 12 detection of shear deformation is examined. A sensor 200 includes a single capacitive sensor 204 having interdigitated electrodes disposed adjacent to a sample under test 202. Shear deformation is given by $U_z = \gamma y$. The capacitance, $C_\theta$, that results in complex strain and stress expressions. However, with reference to FIG. 12, when a sensor rosette including two orthogonal sensors 214, 216 disposed on a substrate 218 is placed adjacent a sample 210, the resultant strain and stress expressions are given by Equations 18 & 19, $$C_\theta - C_{\theta+\pi/2} = \frac{\varepsilon_0 L \ln 2}{8\varepsilon\pi}\alpha_1^2 \gamma^2 \cos 2\theta$$

$$C_\theta - C_{\theta+\pi/2} \approx \frac{\varepsilon_0 L \ln 2}{2\varepsilon\pi}\sigma_{yz}^2 \lambda_1^2 \cos 2\theta$$

thus providing capacitance difference under shear deformation.

Because the sensor of the preferred embodiments provides a direct measurement of deformation without mechanical coupling to the object under test, it is particularly useful in those applications in which destruction of the sample is typically required. For instance, referring again to FIG. 9, composite strength is critically dependent on fiber orientation. Moreover, individual stresses within the composite are often difficult to ascertain. In this regard, destructive measurements have inherent drawbacks. First, composites currently being developed are complex and have significant strength such that performing destructive stress measurements can be dangerous as the composite is broken in to small pieces. Often, therefore, such measurements are laboriously performed layer by layer of the composite. It is also difficult to control the input stresses and provide reliable data as portions of the composite work against one another in response to destructive forces. With respect to FIG. 9, to detect fiber alignment (such as in a composite, disposing dielectrostriction sensor rosettes, such as those described herein, adjacent to the sample provides the opportunity to resolve multiple components of the alignment in a non-destructive manner. In sum, for many applications, non-destructive measurements are preferred.

Yet another useful application concerns process monitoring during the fabrication of certain materials, such as tempered glass. Being able to monitor residual stress and strain during the production of such materials is of particular interest to process engineers was heretofore not readily possible.

Another useful ability is to control shear strains and stresses in liquid and solid materials which are very important for many applications but difficult to accomplish by competitive technologies. Applications include but are not limited by: process control in liquid and solid polymers, stand alone and sensor arrays for mapping shear stresses in tactile applications.

In sum, the preferred embodiments of the sensor take advantage of the electrostrictive properties of a selected dielectric by monitoring the capacitance changes in response to the forces being detected. As appreciated by those in the art, a myriad of applications is possible due to the fact that any dielectric implemented in the sensor exhibits an electrostrictive response which can be monitored as described herein.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

We claim:

1. A solid-state capacitance sensor for measuring deformation of a sample having dielectric properties, the sensor comprising:
more than two pairs of electrostriction sensors that are shifted about 45 degrees with respect to one another to form a rosette, each sensor having at least two electrodes and each having a central axis, wherein the central axes are disposed in a common plane and are oriented substantially mutually perpendicularly to one another; and
wherein the more than two pairs of electrostriction sensors include at least one pair of dummy sensors, and wherein the dummy sensors are used as a reference in resolving three dimensional components of deformation of the dielectric sample substantially simultaneously in response to a force exerted on the dielectric sample.

2. The sensor of claim 1, further comprising a measuring circuit that measures capacitance of each sensor in response to the deformation, and wherein a difference in the measured capacitance is indicative of an amount and a direction of the deformation.

3. The sensor of claim 2, wherein the measuring circuit is a capacitor bridge circuit.

4. The sensor of claim 1, wherein the rosette measures components of the deformation each having a principal axis.

5. The sensor of claim 4, wherein the principal axes are substantially orthogonal to one another.

6. The sensor of claim 1, wherein the more than two pairs of sensors includes at least four pairs of sensors that are shifted about 45 degrees with respect to one another and define a rosette, wherein the rosette measures multiple components of the deformation.

7. The sensor of claim 6, wherein the electrostriction sensors include interdigitated electrodes and are pie-piece shaped, and wherein the sensors are arranged adjacent to one another so that the sensors form a shape having a substantially continuous perimeter.

8. The sensor of claim 1, wherein the electrodes include at least three interdigitated electrodes.

9. The sensor of claim 1, wherein the electrodes are supported by a substrate.

10. The sensor of claim 9, wherein the sensors are microfabricated using a CMOS technique.

11. The sensor of claim 1, wherein the deformation is at least one of a strain and a stress.

12. The sensor of claim 1, further comprising a thin layer of material disposed between the sensors and the sample to facilitate dielectric coupling between the sensors and the sample.

13. The sensor of claim 1, wherein the sensors are disposed adjacent to the sample.

14. The sensor of claim 1, wherein the sample is tempered glass and the sensors measure at least one of a group including stress and strain during formation of the glass.

15. The sensor of claim 1, wherein the sample is anisotropic.

16. The sensor of claim 1, wherein the sensors do not dissipate heat.

17. A method of sensing a deformation of a sample having dielectric properties, the method comprising:
providing more than two pairs of electrostriction sensors that are shifted about 45 degrees with respect to one another to form a rosette, each sensor having at least two electrodes and each having a central axis, wherein the central axes are disposed in a common plane and are oriented substantially mutually perpendicularly to one another;
positioning the sensors adjacent to the dielectric sample having a dielectric property with no mechanical contact between the sensors and the dielectric sample;
measuring a change in capacitance associated with each sensor simultaneously with each other; and
wherein the more than two pairs of electrostriction sensors include at least one pair of dummy sensors, and wherein the dummy sensors are used as a reference in resolving three dimensional components of deformation of the dielectric sample in response to a force exerted on the dielectric sample.

18. The method of claim 17, further comprising computing a difference in the measured capacitance associated with each pair, and determining the deformation by computing a change in a dielectric property of the sample based on the difference; and wherein the electrodes do not substantially move such that the determined deformation is based substantially only on the electrostrictive response of the dielectric to the deformation.

19. The method of claim 17, wherein the more than two pairs of sensors include at least four pairs of sensors and are shifted about 45 degrees with respect to one another, wherein the sensor pairs detect multiple components of the deformation.

20. The method of claim 17, wherein the measuring step is performed using a capacitive bridge.

21. The method of claim 17, wherein the sensors include interdigitated electrodes mounted to a substrate.

22. A solid-state capacitance sensor for measuring deformation of a sample having dielectric properties, the sensor comprising:
more than two pairs of electrostriction sensors each sensor having at least two electrodes and each having a central axis, wherein the central axes are disposed in a common plane and are oriented substantially mutually perpendicularly to one another;
wherein the sample is tempered glass and the sensors measure at least one of a group including stress and strain during formation of the glass; and
wherein the more than two pairs of electrostriction sensors include at least one pair of dummy sensors, and wherein the dummy sensors are used as a reference in resolving three dimensional components of deformation of the dielectric sample in response to one or more forces exerted on the dielectric sample.

23. The solid-state capacitance sensor according to claim 1, wherein there is no mechanical contact between the electrostriction sensors and the dielectric sample.

24. The solid-state capacitance sensor according to claim 7, wherein the shape is an octagon.

* * * * *